United States Patent
Kang et al.

(10) Patent No.: US 9,628,167 B2
(45) Date of Patent: Apr. 18, 2017

(54) METHOD AND APPARATUS FOR BEAMFORMING USING POLARIZED ANTENNA IN A WIRELESS COMMUNICATION SYSTEM

(71) Applicants: LG ELECTRONICS INC., Seoul (KR); KOREA ADVANCED INSTITUTE OF SCIENCE AND TECHNOLOGY, Daejeon (KR)

(72) Inventors: Jiwon Kang, Seoul (KR); Sae-Young Chung, Daejeon (KR); Hyunsoo Ko, Seoul (KR); Jaehoon Chung, Seoul (KR)

(73) Assignees: LG Electronics Inc., Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/895,448

(22) PCT Filed: Feb. 20, 2014

(86) PCT No.: PCT/KR2014/001370
§ 371 (c)(1),
(2) Date: Dec. 2, 2015

(87) PCT Pub. No.: WO2014/196719
PCT Pub. Date: Dec. 11, 2014

(65) Prior Publication Data
US 2016/0142126 A1    May 19, 2016

Related U.S. Application Data

(60) Provisional application No. 61/830,612, filed on Jun. 3, 2013.

(51) Int. Cl.
*H01Q 21/06* (2006.01)
*H04B 7/10* (2017.01)
(Continued)

(52) U.S. Cl.
CPC ............. *H04B 7/10* (2013.01); *H01Q 3/26* (2013.01); *H01Q 21/24* (2013.01); *H01Q 21/29* (2013.01); *H01Q 25/02* (2013.01); *H04B 7/0617* (2013.01)

(58) Field of Classification Search
CPC ...... H04B 7/10; H01Q 25/001; H01Q 25/002; H01Q 25/02; H01Q 21/24; H01Q 21/245
(Continued)

(56) References Cited

U.S. PATENT DOCUMENTS

| | | |
|---|---|---|
| 6,437,750 B1 | 8/2002 | Grimes et al. |
| 2010/0103061 A1 | 4/2010 | Yung et al. |
| 2013/0127685 A1* | 5/2013 | Ikehata ................. H01Q 1/243 343/876 |

FOREIGN PATENT DOCUMENTS

| | | |
|---|---|---|
| EP | 2178157 A1 | 4/2010 |
| JP | 2001-332930 A | 11/2001 |
| WO | WO 2009/111759 A1 | 9/2009 |

* cited by examiner

*Primary Examiner* — Lee Nguyen
(74) *Attorney, Agent, or Firm* — Birch, Stewart, Kolasch & Birch, LLP (57) ABSTRACT

A method and apparatus for beamforming using a polarized antenna in a wireless communication system are disclosed. The apparatus includes a processor configured to process a signal, and a multi-polarized antenna including a plurality of antenna elements, configured to transmit the signal. The plurality of antenna elements include an electric-field dipole antenna and a magnetic-field dipole antenna, and a current is applied to the electric-field dipole antenna and the magnetic-field dipole antenna in the same direction or in opposite directions.

6 Claims, 8 Drawing Sheets

(51) Int. Cl.
    *H04B 7/06*             (2006.01)
    *H01Q 3/26*             (2006.01)
    *H01Q 21/24*           (2006.01)
    *H01Q 21/29*           (2006.01)
    *H01Q 25/02*           (2006.01)
    *H01Q 3/00*             (2006.01)

(58) Field of Classification Search
    USPC .................................................. 342/361–366
    See application file for complete search history.

METHOD AND APPARATUS FOR BEAMFORMING USING POLARIZED ANTENNA IN A WIRELESS COMMUNICATION SYSTEM

CROSS REFERENCE TO RELATED APPLICATIONS

This application is the National Phase of PCT/KR2014/001370 filed on Feb. 20, 2014, which claims priority under 35 U.S.C. 119(e) to U.S. Provisional Application No. 61/830,612 filed on Jun. 3, 2013, all of which are hereby expressly incorporated by reference into the present application.

TECHNICAL FIELD

The present invention relates to a wireless communication system, and more particularly, to a method and apparatus for beamforming using a polarized antenna in a wireless communication system.

BACKGROUND ART

In the present invention, coupling between elements of a polarized antenna is considered. Coupling between antenna elements changes an antenna radiation pattern, compared to an ideal antenna radiation pattern. Accordingly, there is a need for efficiently controlling coupling between antenna elements.

DISCLOSURE

Technical Problem

An object of the present invention devised to solve the problem lies on an interference cancellation method using beamforming through a polarized antenna in a wireless communication system.

Technical Solution

The object of the present invention can be achieved by providing a transmission apparatus in a wireless communication system, including a processor configured to process a signal, and a multi-polarized antenna including a plurality of antenna elements, configured to transmit the signal. The plurality of antenna elements include an electric-field dipole antenna and a magnetic-field dipole antenna, and current is applied to the electric-field dipole antenna and the magnetic-field dipole antenna in the same direction or in opposite directions.

In another aspect of the present invention, provided herein is a method for transmitting a signal using a multi-polarized antenna including a plurality of antenna elements at a transmission apparatus in a wireless communication system, including transmitting a signal in a radiation pattern generated by applying current to an electric-field dipole antenna and a magnetic-field dipole antenna in the same direction or in opposite directions, the magnetic-field dipole antenna and the electric-field dipole antenna being included in the plurality of antenna elements.

In the above aspects of the present invention, if the current is applied to the electric-field dipole antenna and the magnetic-field dipole antenna in the same direction, a radiation pattern of the multi-polarized antenna may include a preferred radiation pattern and a backlobe pattern in a direction opposite to a direction of the preferred radiation pattern.

If the current is applied to the electric-field dipole antenna and the magnetic-field dipole antenna in the opposite directions, a radiation pattern of the multi-polarized antenna may include a preferred radiation pattern and a pattern in the same direction as a direction of the preferred radiation pattern, overlapped with the preferred radiation pattern. If the plurality of antenna elements include a first electric-field dipole antenna, a first magnetic-field dipole antenna, a second electric-field dipole antenna, and a second magnetic-field dipole antenna, currents having opposite phases may be applied to the first electric-field dipole antenna and the first magnetic-field dipole antenna, and currents having opposite phases may be applied to the second electric-field dipole antenna and the second magnetic-field dipole antenna.

Advantageous Effects

According to embodiments of the present invention, beamforming may be performed efficiently using a polarized antenna in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings.

The present invention provides a method for physically controlling interference between multiple users by polarization.

Polarization refers to the trace of an electric field drawn on the plane perpendicular to the direction of travel of electromagnetic waves.

In a polarized antenna, elements are densely arranged in a narrow space, thus being susceptible to coupling. Accordingly, it is necessary to efficiently control the coupling.

Figure 1:
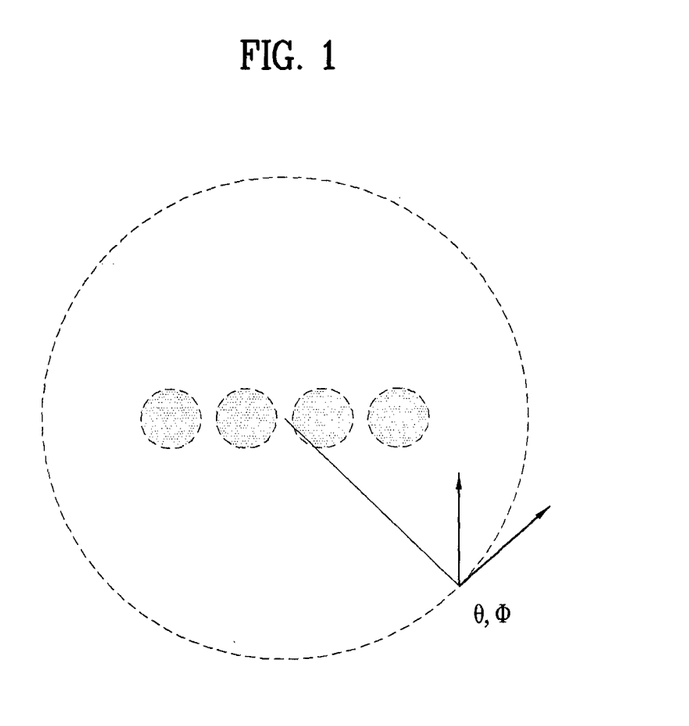
FIG. 1 illustrates an antenna array according to an embodiment of the present invention.

FIG. 1 illustrates an antenna array according to an embodiment of the present invention.

Referring to FIG. 1, a base station includes a polarized antenna.

When beamforming is performed using the radiation pattern of an electric field in a conventional non-polarization scenario, a backlobe opposite to an intended direction always occurs symmetrically, resulting in interference between multiple users. The present invention is intended to remove a backlobe using polarization, obtain an asymmetric radiation pattern, and control the asymmetric radiation pattern in an intended direction.

First, a scattering channel model reflecting a pattern/polarization/orientation is considered. A matrix representing an electric field radiated from a polarized antenna or a radiation pattern of the polarized antenna may be expressed as the following equation.

$$A(\theta, \phi) = \sqrt{\frac{3}{8\pi}} \begin{bmatrix} \sin\theta & \ldots & 0 \\ 0 & \ldots & -\sin\theta \end{bmatrix} \quad \text{[Equation 1]}$$

where the first row represents a $\hat{\theta}$-direction component, the second row represents a $\hat{\phi}$-direction component, and the pattern is normalized to use unit power.

Then a channel model is defined in the form of an array. A matrix representing a linear array of M antennas in three-dimensional space is given as [Equation 2].

$$e(\Delta, \theta, \phi) = \begin{bmatrix} 1 \\ \exp(-j2\pi\Delta\sin\theta\cos\phi) \\ \vdots \\ \exp(-j2\pi(M-1)\Delta\sin\theta\cos\phi) \end{bmatrix} \quad \text{[Equation 2]}$$

where Δ is the distance between antennas in an antenna array. It is assumed that each antenna array radiates an electric field independently, without mutual coupling. An electric field radiated from this antenna array may be expressed as $B(\Delta,\theta,\phi)=e^*(\Delta,\theta,\phi) \otimes A(\theta,\phi)$ based on pattern multiplication.

Figure 2:
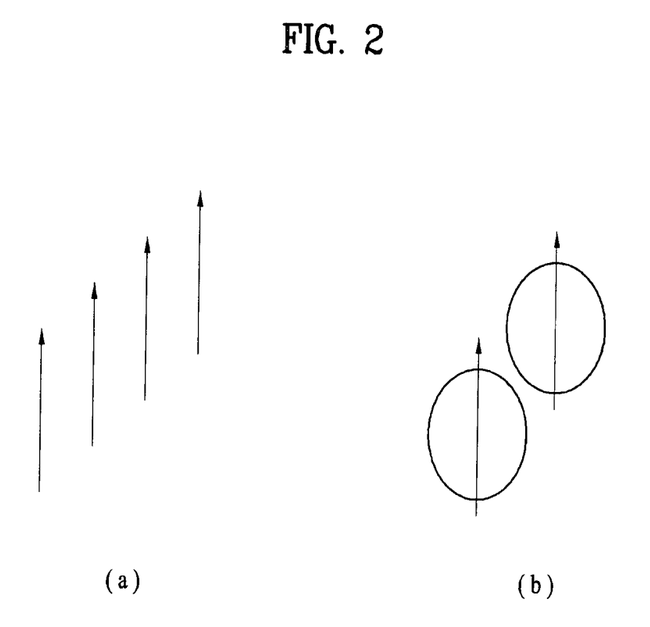
FIG. 2 illustrates an antenna layout for single polarization and an antenna layout for multi-polarization.

Now, performance evaluation will be described. FIG. 2 illustrates an antenna layout for single polarization and an antenna layout for multi-polarization, FIG. 3 illustrates a beam pattern of a single polarized antenna array, and FIG. 4 illustrates beam patterns of a multi-polarized antenna array.

Figure 3:
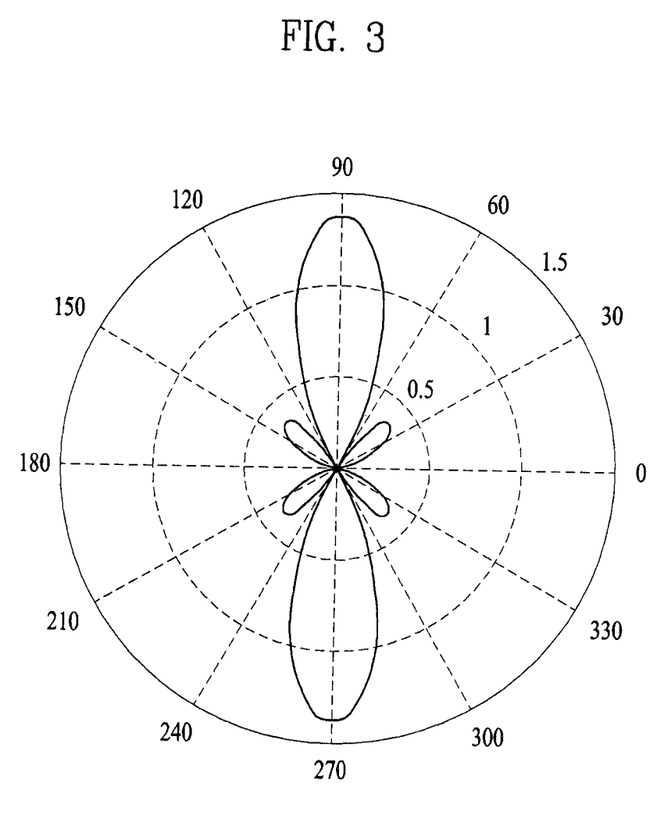
FIG. 3 illustrates a beam pattern of a single-polarized antenna array.

FIG. 3 is a graph illustrating a beam pattern achieved from a single-polarized antenna (i.e. an antenna array of 4 electric-field dipole antennas) as illustrated in FIG. 2 in the case of the above-described channel model. Particularly, it is assumed in FIG. 3 that [1 1 1 1] is applied as an input.

Figure 4:
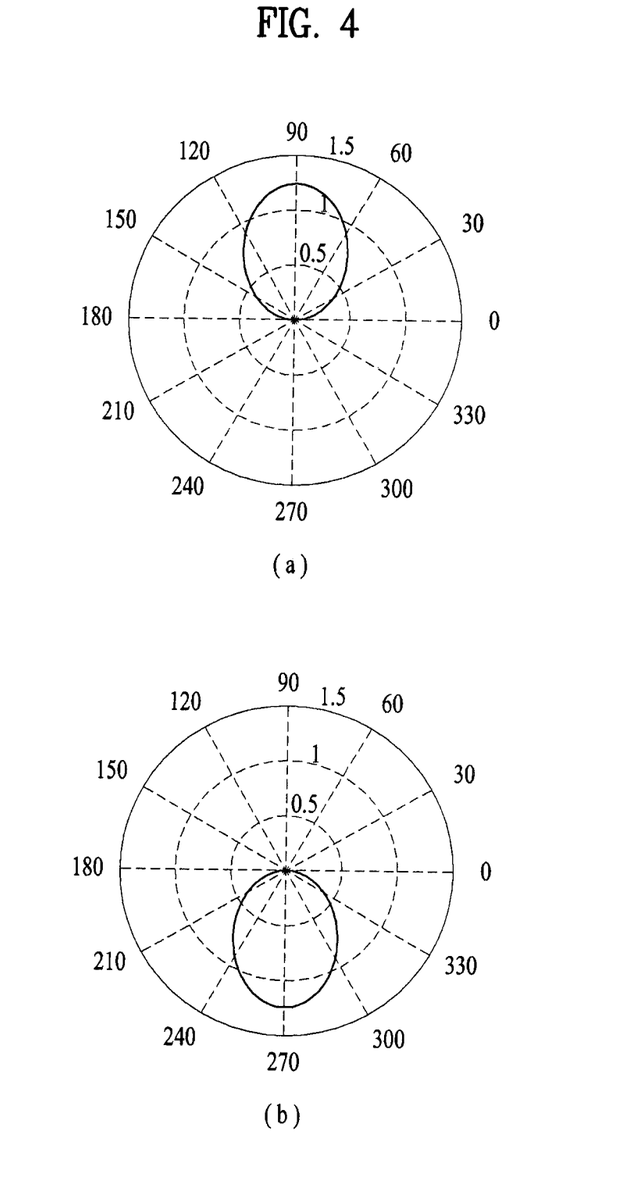
FIG. 4 illustrates beam patterns of a multi-polarized antenna array.

FIG. 4 is graphs illustrating beam patterns achieved from a multi-polarized antenna (i.e. an antenna array of 2 electric-field dipole antennas and 2 magnetic-field dipole antennas) as illustrated in FIG. 2 in the case of the above-described channel model. Particularly, [1 1 1 1] is applied as an input in FIG. 4(a) and [1 −1 1 −1] is applied as an input in FIG. 4(b). If the multi-polarized antenna is used, the conventional symmetric beamforming pattern may be prevented. The radiation pattern may be inversed by applying an input current to the magnetic-field dipole antennas in an opposite direction.

FIGS. 5 to 8 illustrate results of simulations that control the direction of a beam pattern by applying a phase difference to current input to an antenna array. A uniform phase difference is applied to each antenna and the simulations are performed by increasing the phase difference by 30 degrees each time, starting from 0 degree.

To achieve the same beamwidth in two cases, a single-polarized antenna is configured to be an array of 4 electric-field dipole antennas and a multi-polarized antenna is configured to be an array of 2 electric-field dipole antennas and 2 magnetic-field dipole antennas. A channel input is assumed to be $[1e^{j\phi}\ e^{j2\phi}\ e^{j3\phi}]$. Particularly, the input is provided to an electric dipole, a magnetic dipole, the other electric dipole, and the other magnetic dipole in this order in the multi-polarized antenna.

Figure 5:
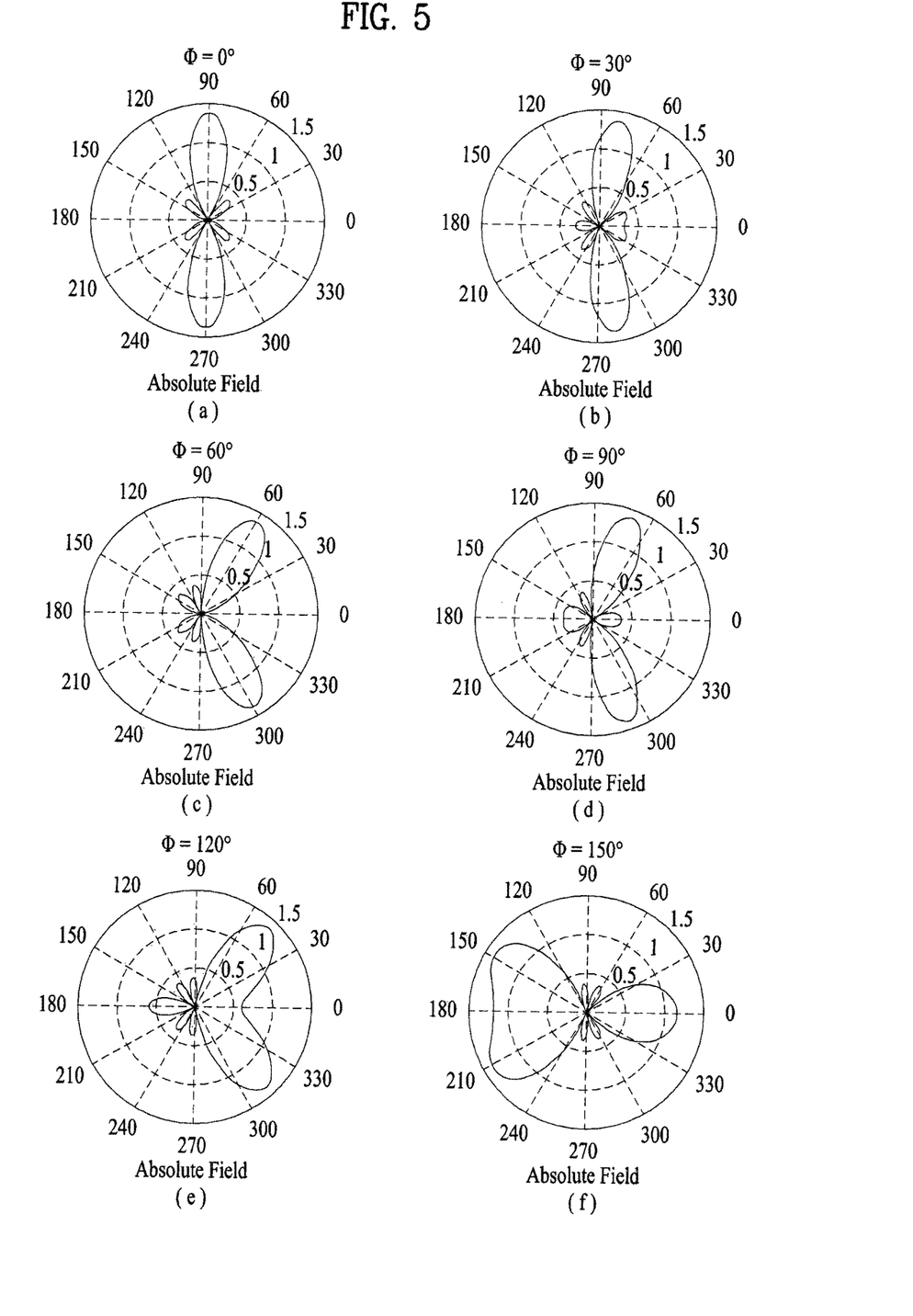
FIGS. 5 to 8 illustrate results of simulations that control the direction of a beam pattern by applying a phase difference to current input to an antenna array.
Figure 6:
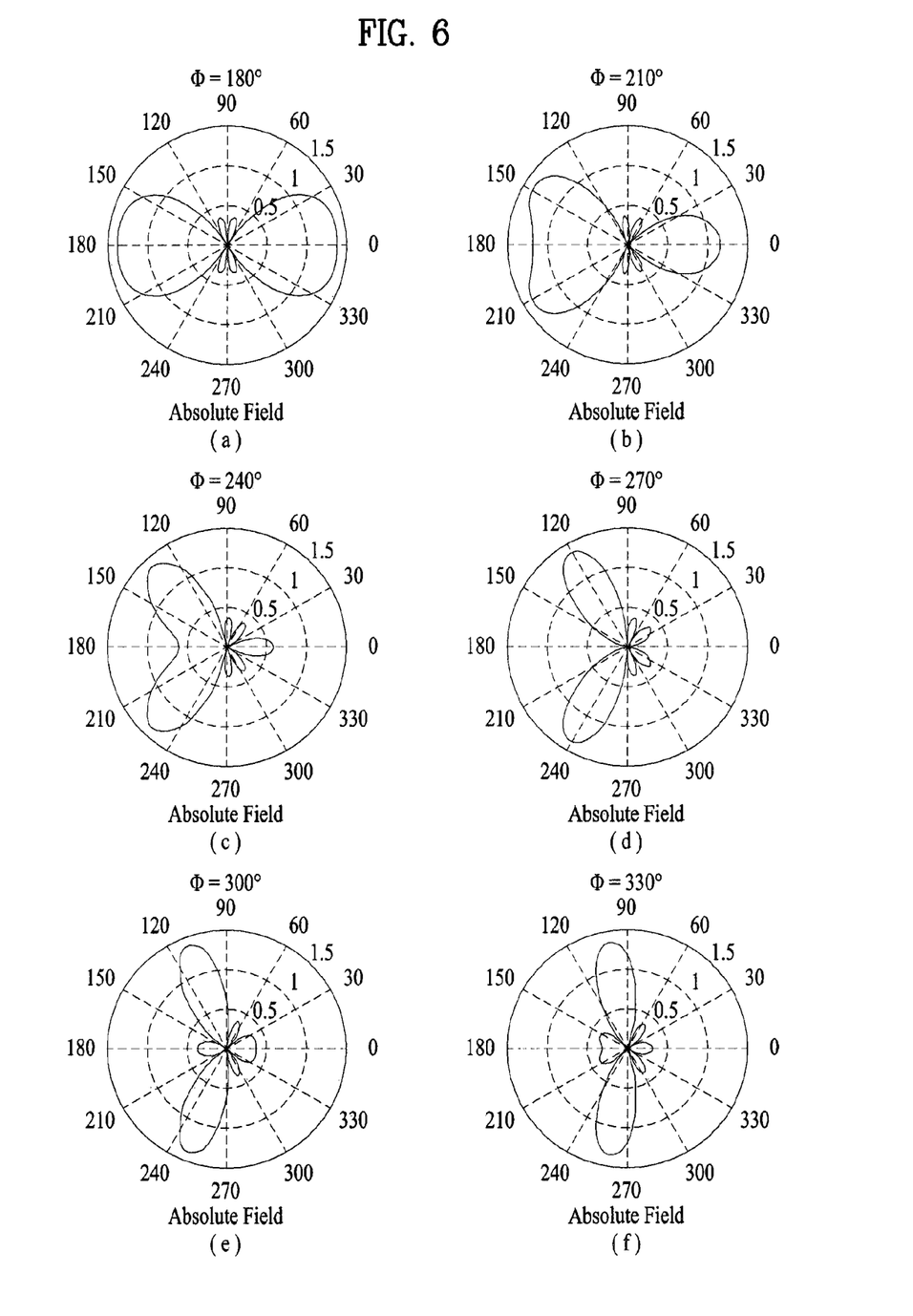
Figure 7:
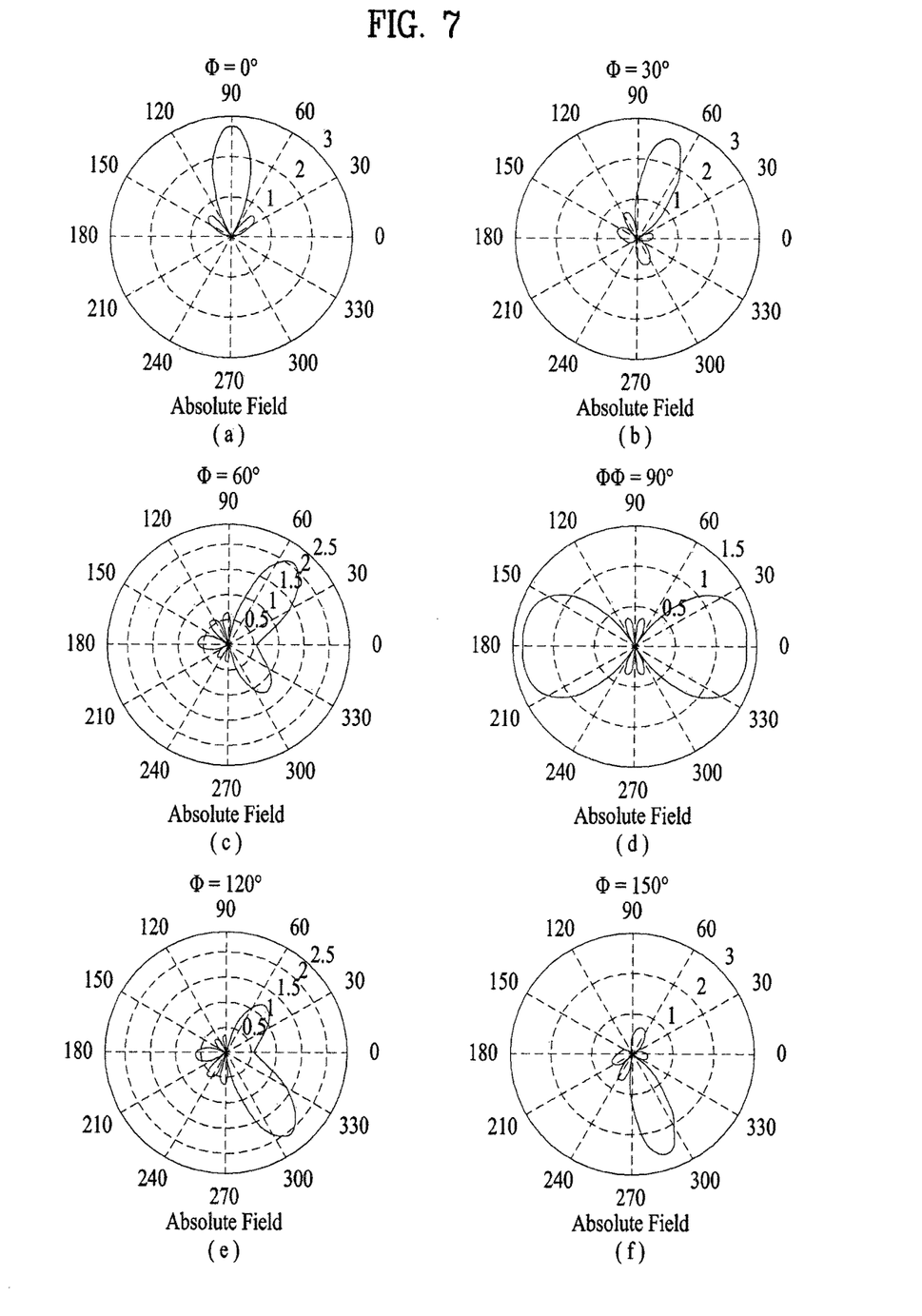
Figure 8:
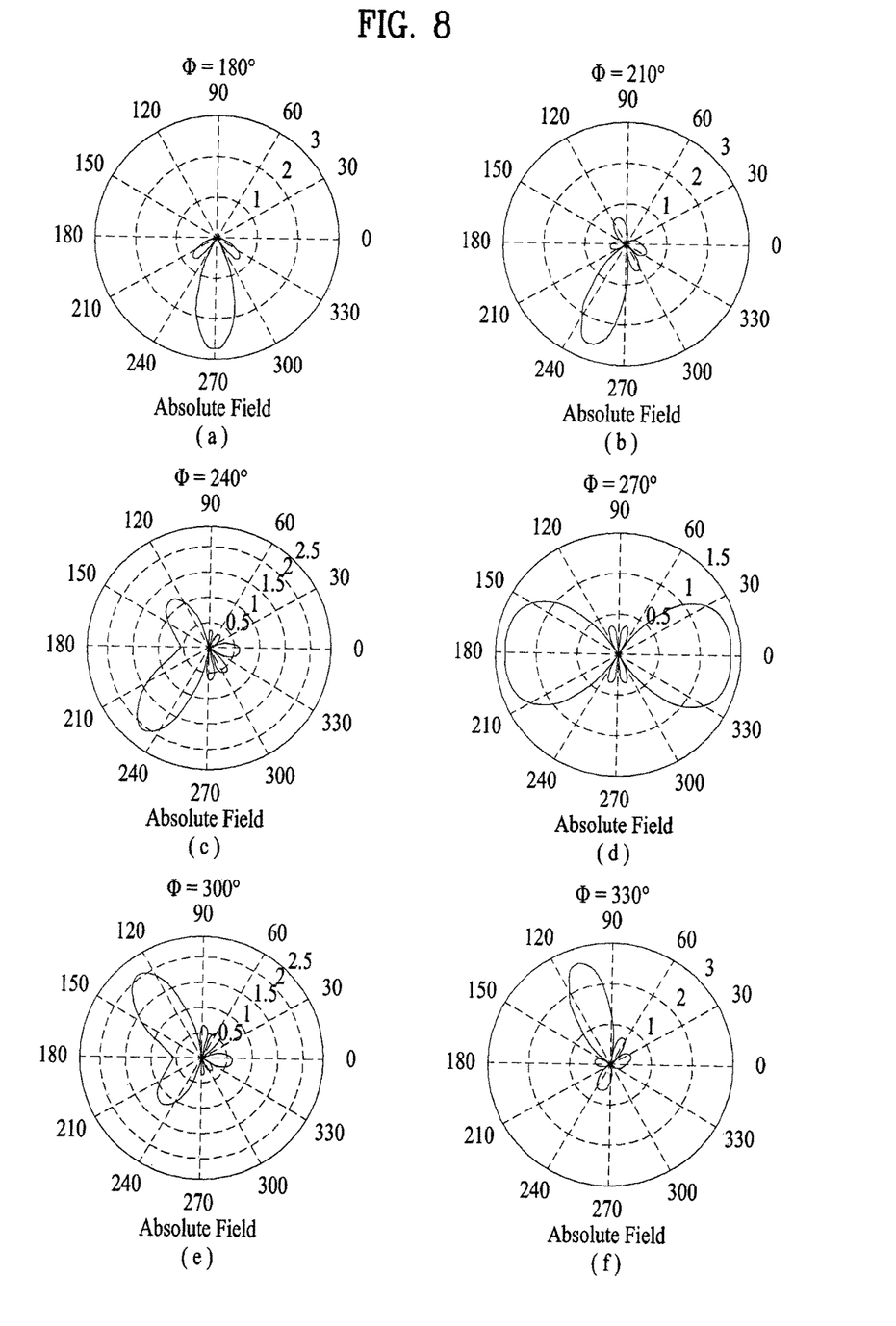

That is, FIGS. 5 to 8 illustrate beam patterns according to changes of ϕ. FIGS. 5 and 6 illustrate radiation patterns of the single-polarized antenna and FIGS. 7 and 8 illustrate radiation patterns of the multi-polarized antenna.

A comparison between FIGS. 5 and 6 and FIGS. 7 and 8 reveals that a radiation pattern may be inversed by applying an input current to the magnetic-field dipole antennas in an opposite direction. Therefore, when a multi-polarized antenna is used, beamforming may be performed in a beam pattern different from the conventional symmetric beam pattern and multiple users may be serviced by respective beams.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

MODE FOR INVENTION

Various embodiments have been described in the best mode for carrying out the invention.

INDUSTRIAL APPLICABILITY

The method and apparatus for beamforming using a polarized antenna according to the present invention are applicable to various wireless communication systems.

The invention claimed is:

1. A transmission apparatus in a wireless communication system, the transmission apparatus comprising:
 a processor configured to process a signal; and
 a multi-polarized antenna including a plurality of antenna elements, configured to transmit the signal,
 wherein the plurality of antenna elements include an electric-field dipole antenna and a magnetic-field dipole antenna, and
 wherein, if a current is applied to the electric-field dipole antenna and the magnetic-field dipole antenna in opposite directions, a radiation pattern of the multi-polarized antenna includes a preferred radiation pattern and a pattern in a same direction as a direction of the preferred radiation pattern, overlapped with the preferred radiation pattern.

2. The transmission apparatus according to claim 1, wherein if the current is applied to the electric-field dipole antenna and the magnetic-field dipole antenna in a same direction, the radiation pattern of the multi-polarized antenna includes the preferred radiation pattern and a backlobe pattern in a direction opposite to a direction of the preferred radiation pattern.

3. The transmission apparatus according to claim 1, wherein the plurality of antenna elements include a first electric-field dipole antenna, a first magnetic-field dipole antenna, a second electric-field dipole antenna, and a second magnetic-field dipole antenna, and wherein currents having opposite phases are applied to the first electric-field dipole antenna and the first magnetic-field dipole antenna, and currents having opposite phases are applied to the second electric-field dipole antenna and the second magnetic-field dipole antenna.

4. A method for transmitting a signal using a multi-polarized antenna including a plurality of antenna elements at a transmission apparatus in a wireless communication system, the method comprising:
 transmitting a signal in a radiation pattern generated by applying a current to an electric-field dipole antenna and a magnetic-field dipole antenna in the same direction or in opposite directions, the magnetic-field dipole antenna and the electric-field dipole antenna being included in the plurality of antenna elements,
 wherein if the current is applied to the electric-field dipole antenna and the magnetic-field dipole antenna in the opposite directions, a radiation pattern of the multi-polarized antenna includes a preferred radiation pattern and a pattern in a same direction as a direction of the preferred radiation pattern, overlapped with the preferred radiation pattern.

5. The method according to claim 4, wherein if the current is applied to the electric-field dipole antenna and the magnetic-field dipole antenna in a same direction, the radiation pattern of the multi-polarized antenna includes the preferred radiation pattern and a backlobe pattern in a direction opposite to a direction of the preferred radiation pattern.

6. The method according to claim 4, wherein the plurality of antenna elements include a first electric-field dipole antenna, a first magnetic-field dipole antenna, a second electric-field dipole antenna, and a second magnetic-field dipole antenna, and wherein currents having opposite phases are applied to the first electric-field dipole antenna and the first magnetic-field dipole antenna, and currents having opposite phases are applied to the second electric-field dipole antenna and the second magnetic-field dipole antenna.

* * * * *